(12) United States Patent
Boni et al.

(10) Patent No.: US 11,269,942 B2
(45) Date of Patent: Mar. 8, 2022

(54) AUTOMATIC KEYPHRASE EXTRACTION FROM TEXT USING THE CROSS-ENTROPY METHOD

(71) Applicant: International Business Machines Corporation, Armonk, NY (US)

(72) Inventors: Odellia Boni, Giva'at Ell (IL); Doron Cohen, Gilon Misgave (IL); Guy Feigenblat, Givataym (IL); David Konopnicki, Haifa (IL); Haggai Roitman, Yokneam Elit (IL)

(73) Assignee: International Business Machines Corporation, Armonk, NY (US)

( * ) Notice: Subject to any disclaimer, the term of this patent is extended or adjusted under 35 U.S.C. 154(b) by 125 days.

(21) Appl. No.: 16/597,887

(22) Filed: Oct. 10, 2019

(65) Prior Publication Data
US 2021/0109959 A1   Apr. 15, 2021

(51) Int. Cl.
| | | |
|---|---|---|
| G06F 16/34 | (2019.01) | |
| G06F 16/332 | (2019.01) | |
| G06F 40/216 | (2020.01) | |
| G06K 9/62 | (2006.01) | |
| G06F 40/295 | (2020.01) | |

(52) U.S. Cl.
CPC ........ *G06F 16/345* (2019.01); *G06F 16/3329* (2019.01); *G06F 40/216* (2020.01); *G06F 40/295* (2020.01); *G06K 9/6228* (2013.01)

(58) Field of Classification Search
CPC ........ G06F 40/35; G06F 40/30; G06F 40/216; G06F 40/295; G06N 20/00

USPC ............... 704/235, 240, 9; 707/706, 741
See application file for complete search history.

(56) References Cited

U.S. PATENT DOCUMENTS

| | | | |
|---|---|---|---|
| 8,090,724 B1* | 1/2012 | Welch | G06K 9/723 |
| | | | 707/750 |
| 9,965,460 B1* | 5/2018 | Wasiuk | G06F 40/284 |
| 10,127,323 B1* | 11/2018 | Boni | G06F 16/345 |
| 2007/0112714 A1* | 5/2007 | Fairweather | G06K 13/0825 |
| | | | 706/46 |
| 2010/0114561 A1* | 5/2010 | Yasin | G06F 40/216 |
| | | | 704/9 |
| 2011/0060983 A1* | 3/2011 | Cai | G06F 16/9562 |
| | | | 715/254 |
| 2012/0143860 A1* | 6/2012 | Gherman | G06F 16/951 |
| | | | 707/727 |

(Continued)

OTHER PUBLICATIONS

Rui Meng et al., "Deep Keyphrase Generation", arXiv, Sep. 18, 2018.

(Continued)

*Primary Examiner* — Akwasi M Sarpong
(74) *Attorney, Agent, or Firm* — Dvir Gassner (57) ABSTRACT

Automated keyphrase extraction from a digital text document. A pool of candidate keyphrases of the digital text document is created. A cross-entropy method is then employed to compute a set of output keyphrases out of the pool of candidate keyphrases, by iteratively optimizing an objective function that is configured to cause the set of output keyphrases to be descriptive of one or more main topics discussed in the digital text document. The set of output keyphrases may be used for at least one of: text summarization, text categorization, opinion mining, and document indexing.

17 Claims, 2 Drawing Sheets

(56) References Cited

U.S. PATENT DOCUMENTS

| | | | |
|---|---|---|---|
| 2012/0246100 A1* | 9/2012 | Shehata | G06F 16/313 |
| | | | 706/12 |
| 2013/0151533 A1* | 6/2013 | Udupa | G06F 16/3325 |
| | | | 707/742 |
| 2013/0173257 A1* | 7/2013 | Rose | G06F 16/35 |
| | | | 704/9 |
| 2014/0279727 A1* | 9/2014 | Baraniuk | G06N 20/00 |
| | | | 706/11 |
| 2015/0186504 A1* | 7/2015 | Gorman | G06F 40/30 |
| | | | 707/752 |
| 2016/0232540 A1* | 8/2016 | Gao | G06Q 10/0637 |
| 2017/0178343 A1* | 6/2017 | Maranatha | G06K 9/00744 |
| 2018/0268053 A1* | 9/2018 | Tata | G06F 16/345 |

OTHER PUBLICATIONS

Pashutan Modaresi Chahardehi, "Components of an Automatic Single Document Summarization System in the News Domain", Feb. 2017, Inaugural-Dissertation, Heinrich Heine University Düsseldorf.

* cited by examiner

AUTOMATIC KEYPHRASE EXTRACTION FROM TEXT USING THE CROSS-ENTROPY METHOD

BACKGROUND

The invention relates to the field of computational linguistics.

Automatic keyphrase extraction is a process which aims to identify important phrases in a document, which relate to the main topic or topics discussed in that document. Extracted keyphrases are usable in many automated language processing tasks and methods, such as text summarization, natural language processing (NLP), information retrieval (IR), text categorization, opinion mining (also known as "sentiment analysis"), and document indexing, to list a few examples. The vast amount of textual data people are required to consume today urges the need for efficient, accurate, and automatic performance of such language processing tasks.

Specifically, with respect to automated text summarization, the ability to extract keyphrases from a document greatly contributes to the task of generic summarization of the document, namely—summarizing the document based only on its contents and not on a provided query. The extracted keyphrases may provide focus for such generic summarization, because they, like the desired summary, represent the main topic or topics of the document.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment provides a method which comprises: receiving a digital text document; automatically creating a pool of candidate keyphrases of the digital text document; and automatically employing a cross-entropy method to compute a set of output keyphrases out of the pool of candidate keyphrases, by iteratively optimizing an objective function that is configured to cause the set of output keyphrases to be descriptive of one or more main topics discussed in the digital text document.

Another embodiment provides a system which comprises: (a) at least one hardware processor; and (b) a non-transitory computer-readable storage medium having program code embodied therewith, the program code executable by said at least one hardware processor to: receive a digital text document; automatically create a pool of candidate keyphrases of the digital text document; and automatically employ a cross-entropy method to compute a set of output keyphrases out of the pool of candidate keyphrases, by iteratively optimizing an objective function that is configured to cause the set of output keyphrases to be descriptive of one or more main topics discussed in the digital text document.

A further embodiment provides a computer program product comprising a non-transitory computer-readable storage medium having program code embodied therewith, the program code executable by at least one hardware processor to: receive a digital text document; automatically create a pool of candidate keyphrases of the digital text document; and automatically employ a cross-entropy method to compute a set of output keyphrases out of the pool of candidate keyphrases, by iteratively optimizing an objective function that is configured to cause the set of output keyphrases to be descriptive of one or more main topics discussed in the digital text document.

In some embodiments, the iterative optimization comprises iterating the following steps: sampling, according to a distribution function, multiple subsets of keyphrases from the pool of candidate keyphrases, to produce candidate keyphrase subsets; evaluating an objective function for each of the candidate keyphrase subsets, to determine elite subsets of keyphrases, wherein the evaluation is based on at least some of the following criteria: (a) high similarity to a frequency distribution in the digital text document, (b) high coverage of the terms frequently appearing in the digital text document, (c) high diversity, (d) long average keyphrase length, (e) small number of keyphrases, (f) short average distance from the beginning of the digital text document; yielding elite samples which comprise those of the candidate keyphrase subsets whose objective values are above a predefined threshold; if a lower bound of the objective function has increased from a previous iteration: updating parameters of the distribution function and reiterating said steps with the updated parameters; and if the lower bound of the objective function has not increased from the previous iteration, performing one of: (i) determining that the parameters of the distribution function are near-optimal, and selecting the set of output keyphrases from the elite samples of one or more previous iterations, and (ii) if the lower bound of the objective function has decreased from the previous iteration, utilizing the lower bound of the previous iteration.

In some embodiments, the creation of the pool of candidate keyphrases comprises: extracting n-grams from the digital text document.

In some embodiments, the creation of the pool of candidate keyphrases comprises: using a parts-of-speech tagging algorithm to extract, from the digital text document, keyphrases conforming to a pattern of one or more parts-of-speech.

In some embodiments, the method further comprises, or the program code is further executable for: calculating a first frequency measure of each unigram term extracted from the digital text document; for each of the subsets of candidate keyphrases, calculating a second frequency measure of each unigram term extracted from the digital text document, according to: (i) for each of the unigram terms extracted from the digital text document which exists in the respective subset of candidate keyphrases, setting the second frequency measure to equal the first frequency measure, and (ii) for each of the unigram terms extracted from the digital text document which does not exist in the respective subset of candidate keyphrases, setting the second frequency measure as zero; and utilizing the first and second frequency measures for the evaluation of the objective function.

In some embodiments, a quantity of the sampled subsets of keyphrases is proportional to a quantity of keyphrases existing in the pool of candidate keyphrases.

In some embodiments, the yielded elite samples comprise those of the candidate keyphrase subsets whose objective values are within a $99^{th}$ percentile of objective values.

In some embodiments, the method further comprises, or the program code is further executable for: automatically using the set of output keyphrases for at least one of: text summarization, text categorization, opinion mining, and document indexing.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Disclosed herein are a method, a system, and a computer program product for extraction of keyphrases from digital text documents (hereinafter "documents" for simplicity). The extraction is performed by the cross-entropy (CE) method, a Monte Carlo method for importance sampling and optimization.

The CE method was first proposed in Rubinstein, R. Y., "Optimization of Computer simulation Models with Rare Events," European Journal of Operational Research (1997), 99, 89-112, and later elaborated in Rubinstein, R. Y. and Kroese, D. P., "The Cross-Entropy Method: A Unified Approach to Combinatorial Optimization, Monte-Carlo Simulation, and Machine Learning," (2004) Springer-Verlag, New York, and in De Boer, P-T., Kroese, D. P, Mannor, S. and Rubinstein, R. Y., "A Tutorial on the Cross-Entropy Method," Annals of Operations Research (2005), 134 (1), 19-67.

In the present disclosure, the CE method is applied to the problem of keyphrase extraction by iteratively optimizing an objective function that is configured to cause the extracted keyphrases to be highly descriptive of the one or more main topics discussed in the digital text document. To this end, the keyphrase extraction problem is formulated as a maximization problem of multiple objectives, such as high similarity of a frequency distribution of terms induced by the extracted keyphrases to a frequency distribution of terms appearing in the document, high coverage of the terms frequently appearing in the document by the extracted keyphrases, high diversity of the extracted keyphrases, long length of each of the extracted keyphrases, small number of extracted keyphrases, and short distance of each of the extracted keyphrases to the beginning of the document, to name a few examples. The objectives delineated above aim to increase the probability that the extracted keyphrases are indeed representative of the main topic(s) discussed in the document. The CE method, applied to such formulated keyphrase extraction problem, has been surprisingly found by the inventors to be suitable for this unique task, yielding keyphrases which are highly descriptive of the main topics of documents.

Figure 1:
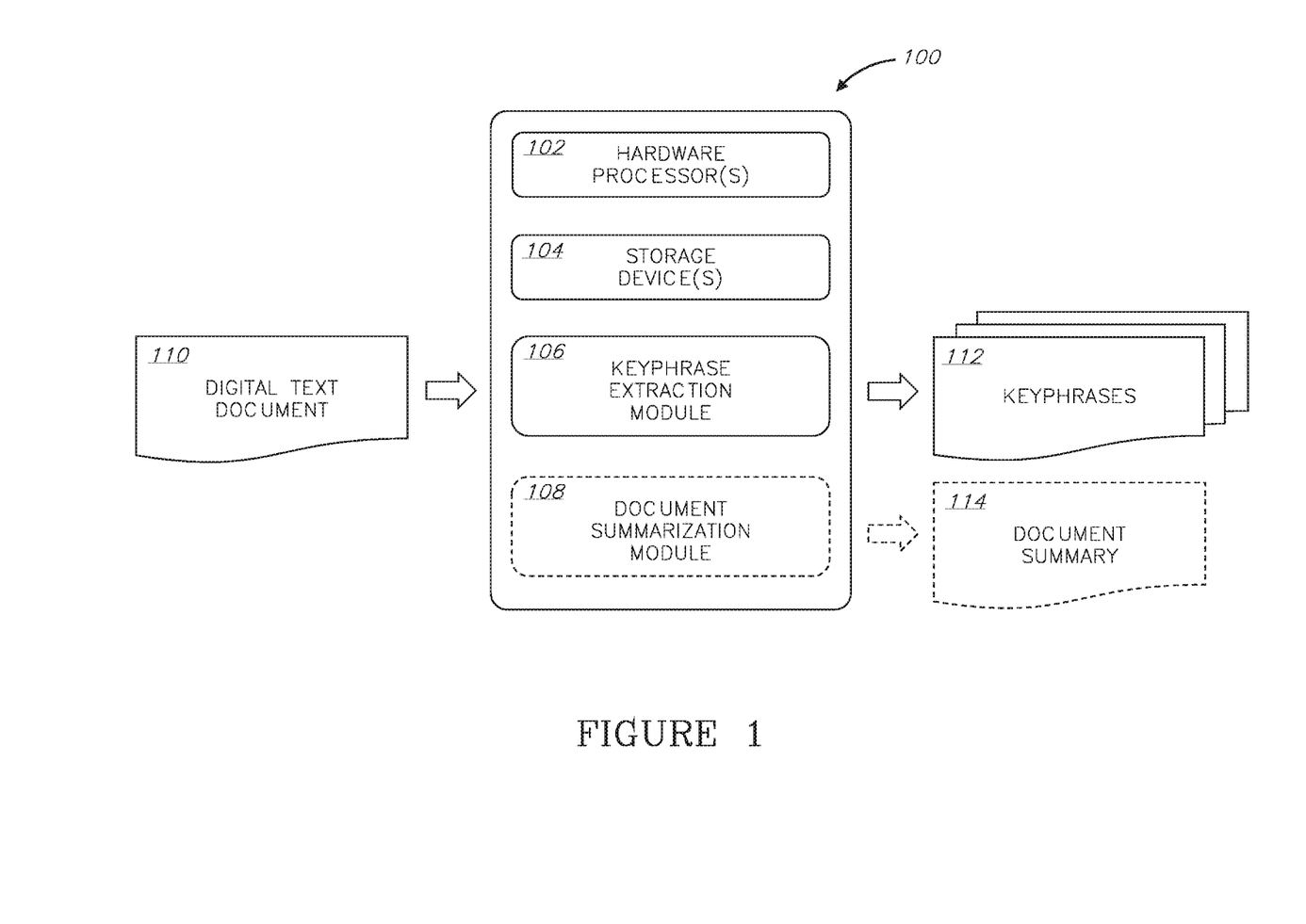
FIG. 1 is a block diagram of an exemplary system for automated keyphrase extraction from a document, according to an embodiment.

Reference is now made to FIG. 1, which shows a block diagram of an exemplary system 100 for automated keyphrase extraction from a document, according to an embodiment. System 100 may comprise one or more hardware processor(s) 102, and one or more non-transitory computer-readable storage device(s) 104. System 100 as described herein is only an exemplary embodiment of the present invention, and in practice may be implemented in hardware only, software only, or a combination of both hardware and software. System 100 may have more or fewer components and modules than shown, may combine two or more of the components, or may have a different configuration or arrangement of the components. System 100 may include any additional component enabling it to function as an operable computer system, such as random-access memory (RAM), motherboard, data busses, power supply, etc. (not shown).

Storage device(s) 104 may have stored thereon software instructions or components configured to operate a processing unit (also "hardware processor," "CPU," or simply "processor"), such as hardware processor(s) 102. In some embodiments, the software components may include an operating system, having various software components and/or drivers for controlling and managing general system tasks (e.g., memory management, storage device control, power management, etc.), and facilitating communication between various hardware and software components. In some embodiments, the program instructions are segmented into one or more software modules, which may include, e.g., a keyphrase extraction module 106 and optionally also a document summarization module 108. Modules 106 and 108 are optionally software modules.

System 100 may receive a document 110 for which keyphrase extraction is required, extract the keyphrases using keyphrase extraction module 106, and output keyphrases 112.

Optionally, system 100 may also employ document summarization module 108 to generate a document summary 114 based on the output keyphrases 112. Summarization module 108 may be substituted by a module for text categorization, opinion mining, document indexing, or the like.

Figure 2:
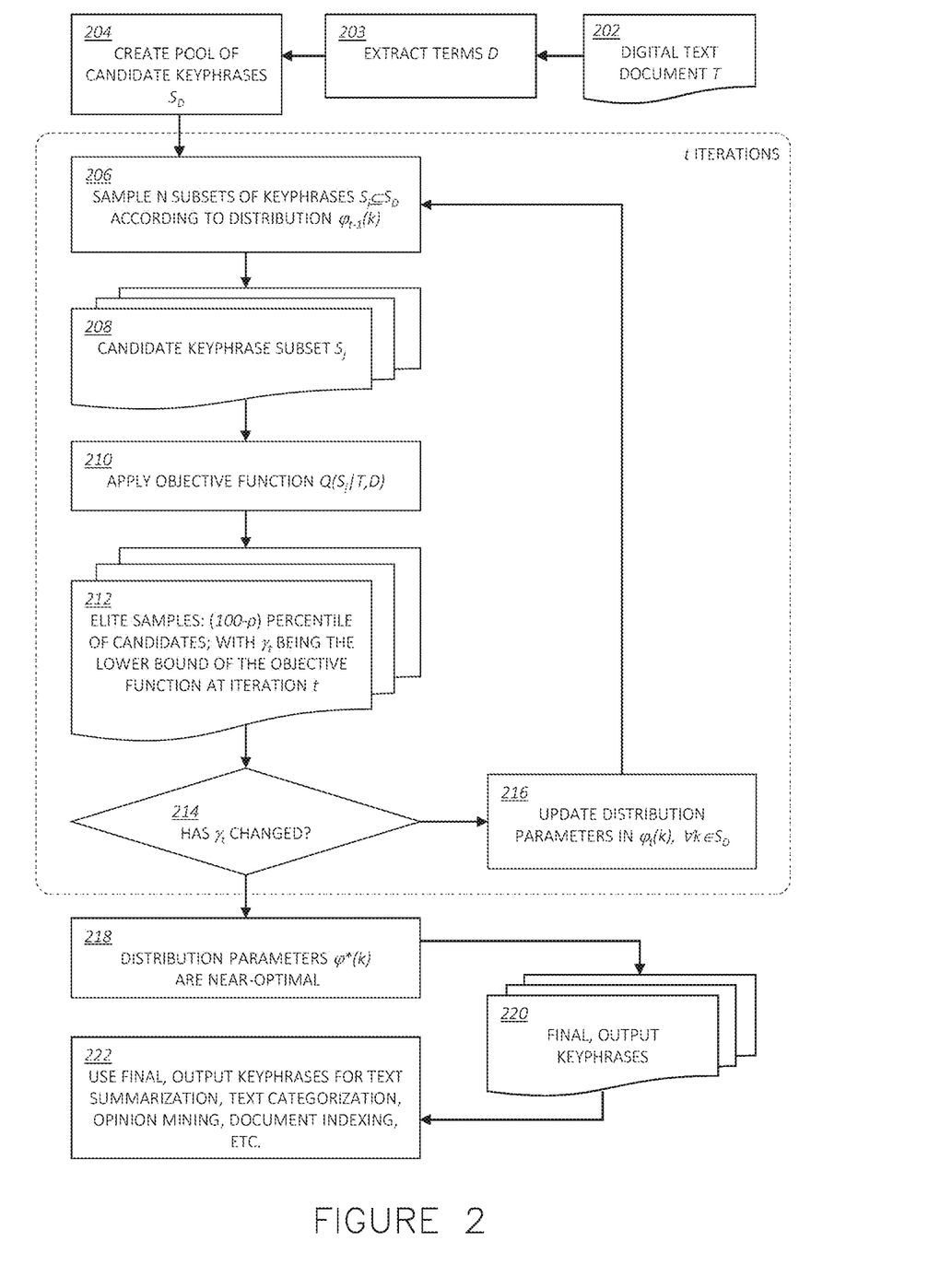
FIG. 2 is a flow chart of an exemplary method for automated keyphrase extraction from a document, according to an embodiment.

An overview of the functional steps in a method for automated keyphrase extraction is provided with reference to the flowchart of FIG. 2. The flowchart illustrates a method for automated keyphrase extraction from a document, which method comprises program instructions constituting modules 106 and 108 of FIG. 1.

In an input step 202, a digital text document T is received. The document may also include graphics, but these are not used in method 200. The text in the document may include tens, hundreds, or even thousands or more words in any language.

In a step 203, unigram terms (namely, single words), except stop words, may be extracted from document T and then stemmed, to produce a set of terms D. Stemming is the process of reducing inflected (or sometimes derived) words to their word stem; for example, reducing the word "running" to its word stem "run". A stop word, as known in the art, is a word which can and should be deliberately ignored because it carries no or little meaning as far as keyphrase extraction is concerned. Examples include words such as articles ("the," "a," "an,"), primary auxiliary verbs (e.g., "am," "is," "are," "do," "be"), etc. In addition, a frequency measure q of each term in D may be calculated, based on a count of this term's occurrences in the document. Further, a predefined amount (number or percentage) of terms having the largest q may be selected, and their counts be normalized (for example, to conform to a range from 0 to 1), to yield a normalized frequency measure v for each of these large-q terms. For example, a selection of those 80% of terms having the largest q has proven to be effective. Other possible percentages may be 50-60%, 60-70%, 70-80%, or 80-90%, to give a few examples. The values of q and v may later aid in evaluating the quality of keyphrase subsets during the CE method.

In a step 204, a pool of candidate keyphrases $S_D$ of the document may be created, by extracting from the document T those phrases (having one word or more) that could, from a linguistic perspective, be keyphrases.

Although steps 203 and 204 are shown in the figure as being consecutive, they may performed in any order, including simultaneously.

The creation of the pool of candidate keyphrases $S_D$ may include, for example, extracting n-grams from the document T, optionally removing stop words from these n-grams (or removing stop words before extracting n-grams), and/or optionally stemming them. An n-gram, as known in the art, is a contiguous sequence of n words from the document. n may be an integer of 1 or above, and in some specific embodiments is between 1-3, 1-5, 1-7, or 1-10. As an alternative to n-gram extraction, a parts-of-speech (POS) tagging algorithm, as known in the art, may be used to extract only those parts-of-speech (e.g., one or more of a noun, pronoun, adjective, determiner, verb, adverb, preposition, conjunction, and interjection) that are of interest. The POS tagging algorithm may also be used, optionally, in conjunction with rules defining a desired pattern of parts-of-speech in an extracted candidate keyphrase.

Then, the CE method is applied to $S_D$ by iterating t times over steps 206-216, until a near-optimal subset of keyphrases is found, in a step 218. In more detail:

In step 206, N subsets of keyphrases $S_j \subseteq S_D$ may be sampled out of the pool $S_D$, according to a distribution function $\phi_t(k)'$. Initially (at t=0), the distribution function may be a uniform distribution of probability for each keyphrase, e.g., a probability of 0.5 for each keyphrase.

N may be directly (linearly or non-linearly) proportional to the number of keyphrases existing in $S_D$. For example, N may equal $10|S_D|^2$, which is a value found to be effective. Alternatively, N may be set to anywhere in the range of ±50% $10|S_D|^2$.

Step 206 produces multiple candidate keyphrase subsets $S_j$ 208 (where j runs from 1 to N) for iteration t.

In step 210, an objective function $Q(S_j|T,D)$ may be evaluated for each candidate keyphrase subset $S_j$ in order to determine an elite set of candidate keyphrase subsets for iteration t, based on one or more criteria, such as high similarity of a frequency distribution of terms induced by the subset keyphrases to a frequency distribution of terms appearing in the document, high coverage of the terms frequently appearing in the document by the subset keyphrases, high diversity of the subset keyphrases, long average length of the subset keyphrases, small number of subset keyphrases, and short average distance of the subset keyphrases to the beginning of the document, to name a few examples.

The objective function may utilize a frequency measure p of each of the terms in D. This measure may be set to equal q if the same term from D exists in $S_j$, and to zero if not. Namely, p will change per $S_j$, and represent the frequency of the terms presently appearing in $S_j$.

The similarity of each candidate keyphrase subset $S_j$ to high-frequency terms in $S_D$ may be formulated as:

$$\sum_{i \in D} \sqrt{q_i p_i}$$

This favors keyphrase subsets having a frequency distribution similar to that in the document.

The coverage of terms in D by each candidate keyphrase subset $S_j$ may be formulated as:

$$\sum_{i \in D} v_i p_i$$

This ensures that keyphrases express as many important topics from the document as possible, and not just a random few.

Diversity of each candidate keyphrase subset $S_j$ may be formulated as:

$$\sum_{i \in D, p_i > 0} -p_i \log\log(p_i),$$

which expresses entropy, as known in the art. The higher the entropy is, the more terms appear in each candidate keyphrase subset $S_j$ and the more balanced their distribution is.

Length of the keyphrases in each candidate keyphrase subset $S_1$, given as the average number of terms per keyphrase, may be formulated as:

$$\frac{\sum_{k \in S_j} |k|}{|S_j|}$$

where $|S_j|$ is the number of keyphrases in the subset, and $|k|$ is the number of terms of keyphrase k.

Lengthy keyphrases are desired because, typically, multi-word keyphrases carry more information and focus, and are more accurate at expressing a main topic which is discussed in the document.

The objective of small number of keyphrases in each candidate keyphrase subset $S_j$ may be formulated as:

$$1 + \frac{1}{|Sj|}$$

which will approach 2 for small subsets and 1 for larger subsets. This penalizes larger subsets.

The average distance of each candidate keyphrase subset $S_j$ from the beginning of the document may be formulated as:

$$\left(\prod_{k \in S_j} 1 + \frac{1}{1 + \text{position of } k}\right)^{\frac{1}{|S_j|}}$$

This is a geometric mean of a monotonic decreasing function of the position of keyphrases in each candidate subset $S_j$. It favors subsets containing keyphrases appearing early in the document. Typically, text documents include topical terms early on, when they introduce the topics of discussion to the reader.

In different embodiments, different ones of these objectives may be used when the CE method is employed, based on user preference. Any combination of two or more of these six objectives is considered an embodiment of the present invention.

The application of the objective function in step 210 yields a set of 'elite samples' 212 (also 'elite subsets') for the present iteration, namely—those candidate keyphrase subsets whose objective values are above a predefined threshold, such as those at the $(100-\rho)^{th}$ percentile of objective values in that iteration. $\rho$ may be set to 1, for example, but may similarly be set to a value between 1 and 10 based on user considerations.

A lower bound $\gamma_t$ of the objective function at the present iteration is also calculated, as the lowest objective value among the values calculated for the elite samples.

Then, in step 214, it is checked whether the lower bound $\gamma_t$ has increased from the previous iteration. If it has, then the CE method is due for another iteration; the distribution parameters in $\phi_t(k)'$ are updated in step 216, followed by re-iteration of steps 206-214. The updating of the distribution parameters is performed as follows:

$$\varphi_t(k) = \frac{\sum_{j=1}^{N} \delta[Q(S_j \mid T, D) \geq \gamma_t] \delta[k \in S_j]}{\sum_{j=1}^{N} \delta[Q(S_j \mid T, D) \geq \gamma_t]}$$

$$\varphi_t(\cdot)' = \alpha \varphi_{t-1}(\cdot) + (1-\alpha)\varphi_t(\cdot)$$

If the lower bound $\gamma_t$ has not increased from the previous iteration or from a few previous iterations, this means that the distribution parameters in $\phi_t(k)'$ for the present iteration are near-optimal 218.

Then, final, output keyphrases 220 may be selected according to one of the following options: First, selecting the candidate keyphrase subset having the highest objective value. Second, resampling keyphrases from $S_D$ according to the final distribution $\phi_t(k)$.

Alternatively, if the lower bound $\gamma_t$ has not increased from the previous iteration but has rather decreased, it is possible to ignore this new lower bound, and just use the lower bound from the previous iteration (namely, $\gamma_{t-1}$).

These final, output keyphrases 220 may be used, in a step 222, for one or more purposes such as text summarization, text categorization, opinion mining, document indexing, or the like.

For example, the final, output keyphrases 220 may be used to automatically generate a summary of the document. Automatic summarization is a well-studied task in machine learning and data mining, in which a text document is shortened using a software algorithm in order to create a summary with the major points of the original document.

Various known summarization algorithms may be used in step 222. These algorithms may either generate a generic ('query-less') summary of the document based on the final, output keyphrases 220, or generate a query-based summary by using these keyphrases as the query. Suitable algorithms may include, for example, those in: Y. Zhang, N. Zincir-Heywood and E. Milios. (2004). "World Wide Web site summarization". Web Intelligence and Agent Systems 2, pp. 39-53; and Sarkar, Kamal. (2014). "A Keyphrase-Based Approach to Text Summarization for English and Bengali Documents." International Journal of Technology Diffusion. Volume 5. 28-38. 10

Such summarization algorithms often require assigning a weight to each keyphrase, so that they know to focus more heavily on some keyphrases and more lightly on others. If such a summarization algorithm is used in step 222, then a weight of each of the final, output keyphrases 220 may be calculated using the probability assigned to it by the CE method.

As another example, with respect to text categorization, the final, output keyphrases 220 of a certain document may be used as a signal to an automatic text categorization algorithm that certain terms in the document should be given higher weight when determining that document's category. For example, the following automatic text categorization algorithm may be used: A. Hulth and B. B. Megyesi (2006) "A study on automatically extracted keywords in text categorization". $21^{st}$ International Conference on Computational Linguistics and the 44th annual meeting of the Association for Computational Linguistics (ACL-44). pp. 537-544, but with the present keyphrase extraction algorithm instead of the keyword extraction algorithm proposed by Hulth.

As another example, with respect to opinion mining, the final, output keyphrases 220 may be used to determine the opinion (pro or con) expressed by a certain document with respect to a topic. For example, the following automatic opinion mining algorithm may be used: G. Berend (2011) "Opinion expression mining by exploiting keyphrase extraction". $5^{th}$ International Joint Conference on Natural Language Processing. pp. 1162-1170, but with the present keyphrase extraction algorithm instead of the keyphrase extraction algorithm proposed by Berend.

In a further example, document indexing, the final, output keyphrases may be used to better index large collections of documents, to enhance the browsing experience of these collections. For instance, the following document indexing algorithm, which uses keyphrases as one of its inputs, may be used: C. Gutwin, G. Paynter, I. Witten, C. Nevill-Manning and E. Frank (1999) "Improving browsing in digital libraries with keyphrase indexes". Decision Support Systems 27, pp. 81-104, but with the present keyphrase extraction algorithm instead of the keyphrase extraction algorithm proposed by Gutwin.

The present invention may be a system, a method, and/or a computer program product. The computer program product may include a computer readable storage medium (or media) having computer readable program instructions thereon for causing a processor to carry out aspects of the present invention. Aspects or actions described herein as "automatic" are performed entirely by the processor, without human intervention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of a numerical range should be considered to have specifically disclosed all the possible subranges as well as individual numerical values within that range. For example, description of a range from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
receiving a digital text document;
automatically creating a pool of candidate keyphrases of the digital text document; and
automatically employing a cross-entropy method to compute a set of output keyphrases out of the pool of candidate keyphrases, by iteratively optimizing an objective function that is configured to cause the set of output keyphrases to be descriptive of one or more main topics discussed in the digital text document,
wherein the objective function comprises at least some of the following objectives: (a) high similarity of the output keyphrases to a terms frequency distribution in the digital text document, (b) high coverage by the output keyphrases of the terms frequently appearing in the digital text document, (c) high diversity of the output keyphrases, (d) long average keyphrase length of the output keyphrases, (e) small number of output keyphrases, (f) short average distance of the output keyphrases fro the beginning of the digital text document;

and wherein the iterative optimization comprises iterating the following steps:

sampling, according to a distribution function, multiple subsets of keyphrases from the pool of candidate keyphrases, to produce candidate keyphrase subsets, evaluating the objective function for each of the candidate keyphrase subsets, to determine elite subsets of keyphrases, yielding elite samples which comprise those of the candidate keyphrase subsets whose objective values are above a predefined threshold, if a lower bound of the objective function has increased from a previous iteration: updating parameters of the distribution function and reiterating said steps with the updated parameters, and if the lower bound of the objective function has not increased from the previous iteration, performing one of: (i) determining that the parameters of the distribution function are near-optimal, and selecting the set of output keyphrases from the elite samples of one or more previous iterations, and (ii) if the lower bound of the objective function has decreased from the previous iteration, utilizing the lower bound of the previous iteration.

2. The method according to claim 1, wherein the creating of the pool of candidate keyphrases comprises: extracting n-grams from the digital text document.

3. The method according to claim 1, wherein the creating of the pool of candidate keyphrases comprises: using a parts-of-speech tagging algorithm to extract, from the digital text document, keyphrases conforming to a pattern of one or more parts-of-speech.

4. The method according to claim 1, further comprising:

calculating a first frequency measure of each unigram term extracted from the digital text document;

for each of the subsets of candidate keyphrases, calculating a second frequency measure of each unigram term extracted from the digital text document, according to:

for each of the unigram terms extracted from the digital text document which exists in the respective subset of candidate keyphrases, setting the second frequency measure to equal the first frequency measure, and for each of the unigram terms extracted from the digital text document which does not exist in the respective subset of candidate keyphrases, setting the second frequency measure as zero; and utilizing the first and second frequency measures for the evaluation of the objective function.

5. The method according to claim 1, wherein a quantity of the sampled subsets of keyphrases is proportional to a quantity of keyphrases existing in the pool of candidate keyphrases.

6. The method according to claim 1, wherein the yielded elite samples comprise those of the candidate keyphrase subsets whose objective values are within a $99^{th}$ percentile of objective values.

7. The method according to claim 1, further comprising automatically using the set of output keyphrases for at least one of: text summarization, text categorization, opinion mining, and document indexing.

8. A system comprising:

(a) at least one hardware processor; and (b) a non-transitory computer-readable storage medium having program code embodied therewith, the program code executable by said at least one hardware processor to;

receive a digital text document, automatically create a pool of candidate keyphrases of the digital text document, and automatically employ a cross-entropy method to compute a set of output keyphrases out of the pool of candidate keyphrases, by iteratively optimizing an objective function that is configured to cause the set of output keyphrases to be descriptive of one or more main topics discussed in the digital text document, wherein the objective function comprises at least some of the following objectives: (a) high similarity of the output keyphrases to a terms frequency distribution in the digital text document, (b) high coverage by the output keyphrases of the terms frequently appearing in the digital text document, (c) high diversity of the output keyphrases, (d) long average keyphrase length of the output keyphrases, (e) small number of output keyphrases, (f) short average distance of the output keyphrases from the beginning of the digital text document, and wherein the iterative optimization comprises iterating the following steps:

sampling, according to a distribution function, multiple subsets of keyphrases from the pool of candidate keyphrases, to produce candidate keyphrase subsets, evaluating the objective function for each of the candidate keyphrase subsets, to determine elite subsets of keyphrases, yielding elite samples which comprise those of the candidate keyphrase subsets whose objective values are above a predefined threshold, if a lower bound of the objective function has increased from a previous iteration: updating parameters of the distribution function and reiterating said steps with the updated parameters, and if the lower bound of the objective function has not increased from the previous iteration, performing one of: (i) determining that the parameters of the distribution function are near-optimal, and selecting the set of output keyphrases from the elite samples of one or more previous iterations, and (ii) if the lower bound of the objective function has decreased from the previous iteration, utilizing the lower bound of the previous iteration.

9. The system according to claim 8, wherein the creating of the pool of candidate keyphrases comprises: extracting n-grams from the digital text document.

10. The system according to claim 8, wherein the creating of the pool of candidate keyphrases comprises: using a parts-of-speech tagging algorithm to extract, from the digital text document, keyphrases conforming to a pattern of one or more parts-of-speech.

11. The system according to claim 8, wherein the program code is further executable by said at least one hardware processor to:

calculate a first frequency measure of each unigram term extracted from the digital text document;

for each of the subsets of candidate keyphrases, calculate a second frequency measure of each unigram term extracted from the digital text document, according to:
for each of the unigram terms extracted from the digital text document which exists in the respective subset of candidate keyphrases, set the second frequency measure to equal the first frequency measure, and
for each of the unigram terms extracted from the digital text document which does not exist in the respective subset of candidate keyphrases, set the second frequency measure as zero; and
utilize the first and second frequency measures for the evaluation of the objective function.

12. The system according to claim 8, wherein a quantity of the sampled subsets of keyphrases is proportional to a quantity of keyphrases existing in the pool of candidate keyphrases.

13. The system according to claim 8, wherein the yielded elite samples comprise those of the candidate keyphrase subsets whose objective values are within a $99^{th}$ percentile of objective values.

14. The system according to claim 8, wherein the program code is further executable by said at least one hardware processor to automatically use the set of output keyphrases for at least one of: text summarization, text categorization, opinion mining, and document indexing.

15. A computer program product comprising a non-transitory computer-readable storage medium having program code embodied therewith, the program code executable by at least one hardware processor to:
receive a digital text document;
automatically create a pool of candidate keyphrases of the digital text document; and
automatically employ a cross-entropy method to compute a set of output keyphrases out of the pool of candidate keyphrases, by iteratively optimizing an objective function that is configured to cause the set of output keyphrases to be descriptive of one or more main topics discussed in the digital text document,
wherein the objective function comprises at least some of the following objectives: (a) high similarity of the output keyphrases to a terms frequency distribution in the digital text document, (b) high coverage by the output keyphrases of the terms frequently appearing in the digital text document, (c) high diversity of the output keyphrases, (d) long average keyphrase length of the output keyphrases, (e) small number of output keyphrases, (f) short average distance of the output keyphrases from the beginning of the digital text document,
and wherein the iterative optimization comprises iterating the following steps:
sampling, according to a distribution function, multiple subsets of keyphrases from the pool of candidate keyphrases, to produce candidate keyphrase subsets,
evaluating the objective function for each of the candidate keyphrase subsets, to determine elite subsets of keyphrases,
yielding elite samples which comprise those of the candidate keyphrase subsets whose objective values are above a predefined threshold,
if a lower bound of the objective function has increased from a previous iteration: updating parameters of the distribution function and reiterating said steps with the updated parameters, and
if the lower bound of the objective function has not increased from the previous iteration, performing one of: (i) determining that the parameters of the distribution function are near-optimal, and selecting the set of output keyphrases from the elite samples of one or more previous iterations, and (ii) if the lower bound of the objective function has decreased from the previous iteration, utilizing the lower bound of the previous iteration.

16. The computer program product according to claim 15, wherein the program code is further executable by said at least one hardware processor to:
calculate a first frequency measure of each unigram term extracted from the digital text document;
for each of the subsets of candidate keyphrases, calculate a second frequency measure of each unigram term extracted from the digital text document, according to:
for each of the unigram terms extracted from the digital text document which exists in the respective subset of candidate keyphrases, set the second frequency measure to equal the first frequency measure, and for each of the unigram terms extracted from the digital text document which does not exist in the respective subset of candidate keyphrases, set the second frequency measure as zero; and
utilize the first and second frequency measures for the evaluation of the objective function.

17. The computer program product according to claim 15, wherein the yielded elite samples comprise those of the candidate keyphrase subsets whose objective values are within a $99^{th}$ percentile of objective values.

* * * * *